March 3, 1931.　　　　J. A. WALSH　　　　1,794,658
HARVESTER
Filed Nov. 19, 1929　　　2 Sheets-Sheet 1
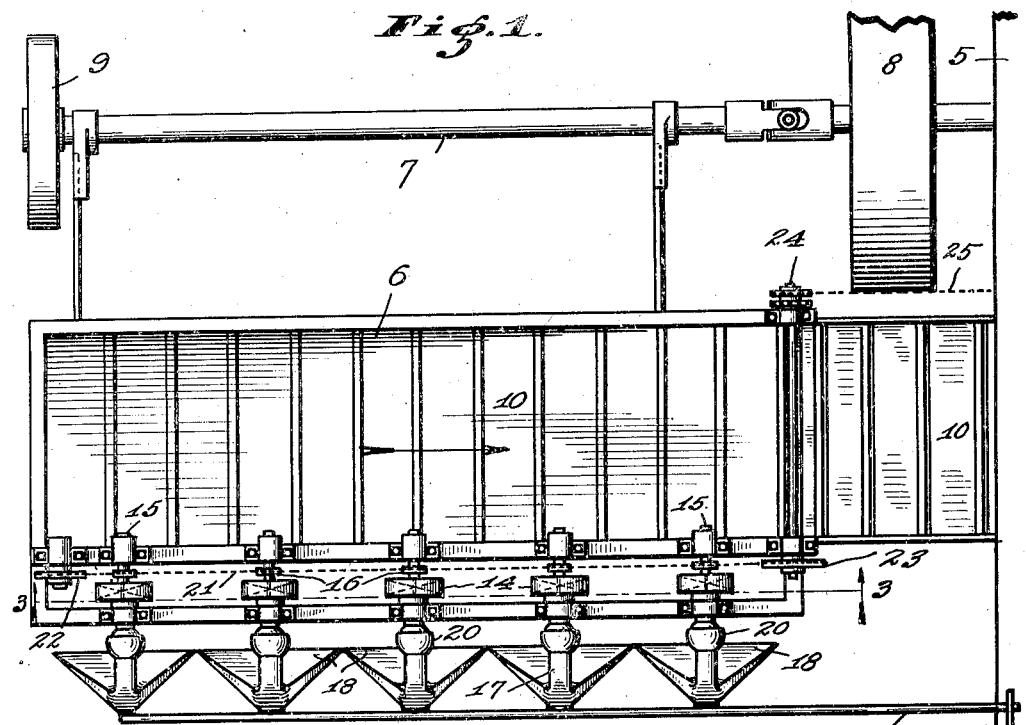
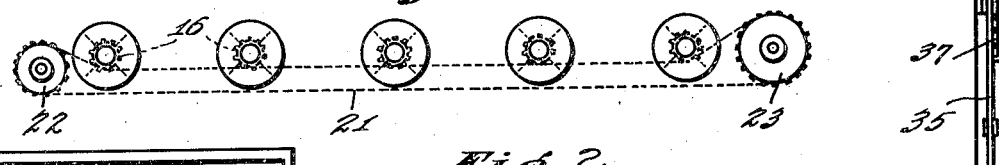
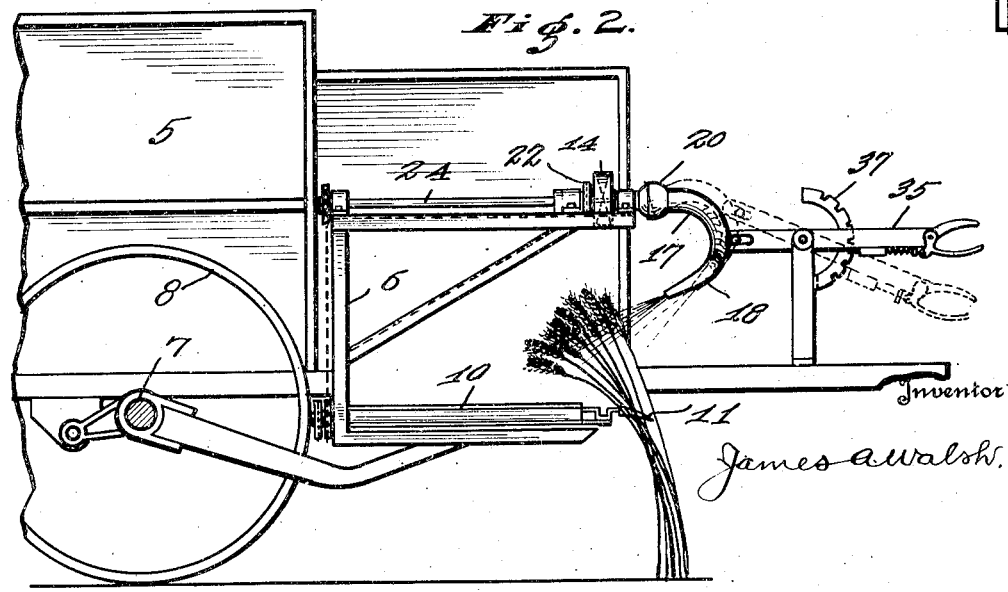
Inventor
James A Walsh.

March 3, 1931.  J. A. WALSH  1,794,658
HARVESTER
Filed Nov. 19, 1929  2 Sheets-Sheet 2
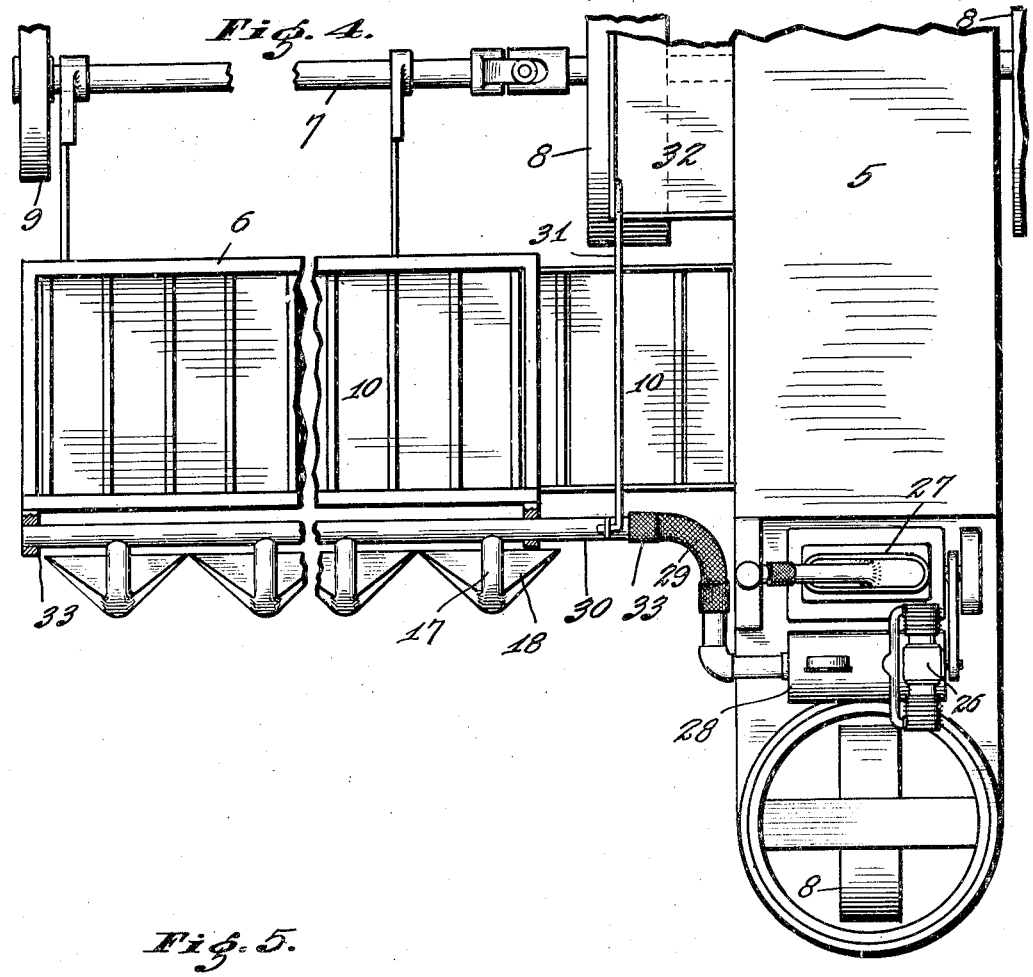
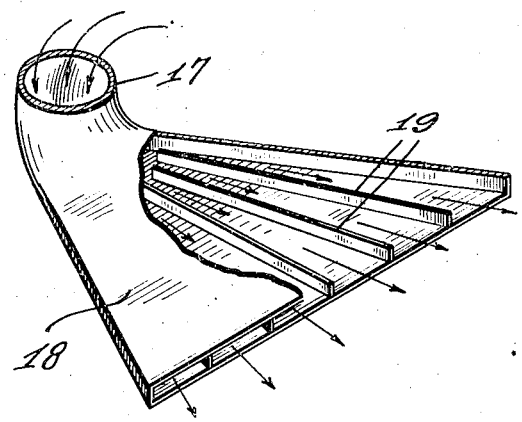
Inventor
James A Walsh Patented Mar. 3, 1931

1,794,658

UNITED STATES PATENT OFFICE

JAMES A. WALSH, OF INDIANAPOLIS, INDIANA, ASSIGNOR TO J. I. CASE COMPANY, OF RACINE, WISCONSIN, A CORPORATION

HARVESTER

Application filed November 19, 1929. Serial No. 408,242.

In the operation of grain harvesters it is the practice to employ a revolving reel at the forward side of the header for gathering the standing grain stalks into position to be cut by the sickle and to direct the fall of the cut grain onto the header platform to be carried therefrom to a thrasher or otherwise by the conveyor forming part of the header, such reels comprising radial arms equipped with slats or bats. As a machine thus equipped is traversing the field the bats of the revolving reel when sweeping through the ripened grain impart a glancing but forcible blow to much of the standing stalks without gathering them, with a shattering effect, resulting in considerable loss of loose kernels and broken grain laden stalks which fall to the ground and become wasted, and therefore a material loss occurs in harvesting. It is the object of my invention to provide means for directing the standing grain with certainty toward the sickle in a gentle but effective manner without subjecting the stalks to the violent blows or shattering influence imparted by revolving reels, thus obviating the loss explained, and which I accomplish pneumatically in the manner to be hereinafter described.

In the accompanying drawings, forming part hereof, Figure 1 is a plan view of a header embodying my improvement; Fig. 2, an end elevation; Fig. 3, a detail taken on the dotted line 3—3 in Fig. 1; Fig. 4, a plan view of a modified form of my improvement; and Fig. 5 is a perspective of an air distributing nozzle which I employ.

In said drawings the numeral 5 indicates the thrasher element of a combination harvester-thrasher, to which the header 6 is secured by an extension axle 7 or otherwise, and which thrasher and header are supported by wheels 8 and 9, as is common. The header 6 may be of any desired construction and embodies a conveyor 10 which carries grain, cut by the usual sickle 11, into the thrasher.

In carrying out my invention, as indicated, I eliminate the reel commonly employed, and instead provide means for creating and discharging air under pressure across the sickle, which directs the standing grain into position to be severed thereby. On the upper side of the header I may mount a series of fans 14 supported by shafts 15 on which are mounted sprockets 16, the fans having discharge outlets 17 leading therefrom, and which outlets are provided with nozzles 18 preferably embodying baffles 19 for spreading the air discharging from the fans, the discharge outlets being preferably connected to the fans by ball-and-socket joints 20, as indicated in Fig. 2. The sprockets 16 are simultaneously actuated to rotate the fans by a chain 21 connecting the sprockets 22, 23, and which chain engages said sprockets 16, as indicated in Fig. 3, the sprocket 23 being driven by a shaft 24, which latter in turn is actuated by a sprocket-and-chain system 25 from any suitable source of power on the thrasher (not shown), or said fans may be rotated by any other suitable mechanisms as desired. However, as indicated in Fig. 4, instead of using fans and operating mechanisms therefor to create and distribute air under pressure, I may employ as the equivalent therefor, an air compressor 26, operated by the engine 27 usually carried on the front of the thrasher 5, in connection with a reservoir 28, for compressing air, which will be forced through the flexible connection 29 and thence through pipe 30 and into the nozzles 18 to be distributed thereby as hereinbefore explained; and should it be desired to adjust the nozzles vertically this can be readily accomplished by manipulating a rod 31 attached to said pipe and extending to the usual platform 32 of the thrasher and within convenient reach of an attendant, by which said pipe 30, trunnioned at 33, may be rocked to the extent desired and which will accordingly adjust said nozzles 18. When employing the construction indicated in Figs. 1 and 2, the nozzles may also be vertically adjusted in any suitable manner, that shown for illustration being a lever 35, connected to a rod 36 which in turn is secured to the nozzles, and which lever in cooperation with a quadrant 37 may be manually operated in a well known manner to simultaneously adjust said nozzles.

In operation it will be understood that the machine is moving through the field into the standing grain, and as it progresses the air blasts from the nozzles continuously force the grain stalks rearwardly and across the cutting knives or sickle, as indicated in Fig. 2, by which they are being constantly severed and fall onto the conveyer 10 of the header, the rearward movement of the cut grain at the same time being accelerated by the air currents, so that there will be no spilling or loss of cut grain heads over the forward or cutting side of the header.

I claim as my invention:

1. In a header embodying cutting and conveying mechanisms, a plurality of fans supported on the header, a nozzle extending from each of said fans, and means associated with the header for actuating the fans simultaneously for creating and discharging air blasts against standing grain.

2. In a header embodying cutting and conveying mechanisms, a plurality of fans on the header, a nozzle extending from each of said fans, means associated with the header for actuating the fans simultaneously to create and discharge a multiplicity of air blasts against standing grain, and means for simultaneously adjusting said nozzles in vertical direction in relation to the height of grain to be cut.

In testimony whereof I affix my signature.

JAMES A. WALSH.